United States Patent
Trapani et al.

(10) Patent No.: US 9,678,364 B2
(45) Date of Patent: *Jun. 13, 2017

(54) METHOD AND APPARATUS FOR FORMING SUNGLASS LENSES WITH A PREDETERMINED GRADIENT

(71) Applicants: Giorgio Trapani, Cambridge, MA (US); Robert K. Tendler, Chestnut Hill, MA (US)

(72) Inventors: Giorgio Trapani, Cambridge, MA (US); Robert K. Tendler, Chestnut Hill, MA (US)

(73) Assignee: Distributed Polarization Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,581

(22) Filed: May 18, 2016

(65) Prior Publication Data

US 2016/0266411 A1 Sep. 15, 2016

Related U.S. Application Data

(62) Division of application No. 14/197,464, filed on Mar. 5, 2014, now Pat. No. 9,372,353.

(51) Int. Cl.

| | | |
|---|---|---|
| *B41J 2/01* | (2006.01) | |
| *G02C 7/12* | (2006.01) | |
| *G02C 7/02* | (2006.01) | |
| *G02B 1/04* | (2006.01) | |
| *C09D 11/12* | (2006.01) | |
| *G02C 7/10* | (2006.01) | |
| *B29D 11/00* | (2006.01) | |
| *B29K 29/00* | (2006.01) | |
| *B29L 9/00* | (2006.01) | |

(52) U.S. Cl.
CPC .......... *G02C 7/12* (2013.01); *B29D 11/00644* (2013.01); *B29D 11/00923* (2013.01); *G02B 1/041* (2013.01); *G02C 7/105* (2013.01); *B29K 2029/04* (2013.01); *B29L 2009/00* (2013.01)

(58) Field of Classification Search
CPC . G02C 7/02; G02C 7/12; G02C 7/105; B29D 11/00644; B29D 11/00923; B29K 2029/04; G02B 1/041; G02B 1/04; B41J 2/01; B29L 2009/00; C09D 11/12
See application file for complete search history.

(56) References Cited

U.S. PATENT DOCUMENTS

| | | | |
|---|---|---|---|
| 9,372,353 B2 * | 6/2016 | Trapani | G02C 7/12 |
| 2004/0130676 A1 * | 7/2004 | Doshi | B29D 11/00317 |
| | | | 351/159.25 |
| 2004/0257525 A1 * | 12/2004 | Moravec | G02C 7/12 |
| | | | 351/159.62 |

(Continued)

FOREIGN PATENT DOCUMENTS

| | | | | |
|---|---|---|---|---|
| JP | 2004038107 A | * | 2/2004 | G02C 7/02 |
| JP | 2004361644 A | * | 12/2004 | B41J 2/01 |
| JP | 2006264109 A | * | 10/2006 | G02C 7/02 |

*Primary Examiner* — Nguyen Ha
(74) *Attorney, Agent, or Firm* — Hayes Soloway PC

(57) ABSTRACT

A method for forming sunglass lenses with a predetermined optical gradient, namely a polarized gradient, or transmissivity gradient in which a gradient pattern is provided on an oriented sheet. The oriented sheet is incorporated into a lens to provide the lens with the associated gradient.

19 Claims, 5 Drawing Sheets

(56) References Cited

U.S. PATENT DOCUMENTS

| | | | | |
|---|---|---|---|---|
| 2008/0127432 A1* | 6/2008 | Burguiere | ............... | G02B 1/041 |
| | | | | 8/507 |
| 2008/0252847 A1* | 10/2008 | Nesty | ........................ | G02C 7/12 |
| | | | | 351/159.64 |
| 2009/0091825 A1* | 4/2009 | Saito | ........................ | G02B 1/115 |
| | | | | 359/488.01 |
| 2009/0152747 A1* | 6/2009 | Hsu | .................... | B29D 11/0073 |
| | | | | 264/1.32 |
| 2011/0032475 A1* | 2/2011 | Watanabe | ................. | G02C 7/12 |
| | | | | 351/159.56 |
| 2012/0249949 A1* | 10/2012 | Miyoshi | ............ | B29D 11/00903 |
| | | | | 351/159.66 |
| 2015/0219931 A1* | 8/2015 | Grasso | ..................... | G02C 7/10 |
| | | | | 351/159.56 |
| 2015/0231839 A1* | 8/2015 | Su | ......................... | G02C 7/102 |
| | | | | 351/159.61 |

* cited by examiner

METHOD AND APPARATUS FOR FORMING SUNGLASS LENSES WITH A PREDETERMINED GRADIENT

This application is a divisional of co-pending application Ser. No. 14/197,464, filed Mar. 5, 2014, which is hereby incorporated herein by reference in its entirety.

FIELD OF INVENTION

This invention relates to the manufacture of sunglass lenses and more particularly to a method and apparatus for forming sunglass lenses with a predetermined polarization or color gradient in which the lenses are provided with the gradient through the utilization of inkjet printing.

BACKGROUND OF THE INVENTION

As described in U.S. Pat. No. 7,374,282 issued to Robert K. Tendler on May 20, 2008, it is desirable to provide sunglass lenses with a polarization gradient such that when one views the far field one looks at a polarized scene, whereas when one looks at the near field where a polarized display might be located one sees the polarized display without it being blackened by cross polarization.

As described in the aforementioned patent, one of the ways of providing for gradient polarization in which there is maximum polarization at the top of the lens and minimum polarization at the bottom of the lens is to provide differential stretching of the oriented material which is provided with a stain, such as iodine or a dichroic dye. This then provides the final structure with a gradient polarization characteristic.

However this type of technique is difficult to achieve and while there may be many other ways of providing for gradient polarization for a polarized sheet, there remains the problem in providing a true gradient polarized lens. Moreover there are problems in providing for gradient lenses in which the color or filter characteristics of the lens vary across the face of the lens.

It will be appreciated that if one can provide a gradient polarized lens with printable characteristics, it would be very easy to fashion specialty lenses having required specialized characteristics simply by printing.

As to printing to provide polarized films with either a transparency image or a printed image, inkjet printing has been used to produce 3-D viewable images by overprinting polarized material or films with dichroic dyes or other colorants. In one embodiment their 3-D imaging involves printing on one side of an oriented film with one image and an offset version of the same image on the opposite side of the film. When viewed stereoscopically with oppositely circularly polarized glasses, one sees a 3-D image of the artwork printed on the polarized film due to the offset in the images front and back. Inkjet printing of oriented substrates has been described in U.S. Pat. Nos. 5,552,182; 5,591,508; 5,758,036; 5,764,248; 6,013,123; and 6,347,851 issued to Julius J. Scarpetti, all incorporated herein by reference. It will be appreciated that nowhere in the Scarpetti patents is suggested providing a transparency involving an oriented substrate with a gradient pattern, either for providing a gradient polarization characteristic or for providing color filtering characteristics.

SUMMARY OF INVENTION

In order to provide sunglass lenses with a predetermined characteristics such as a gradient characteristic, in the subject invention when an oriented sheet is utilized in the formation of the polarizing layer for the sunglasses, this oriented sheet is imprinted utilizing an inkjet printer to provide a transparency, in one embodiment using transparent dichroic dyes, such that the oriented sheet is selectively stained with the dyes to provide a transparency with the required gradient. In one embodiment, the pattern of the inkjet-printed dyes provide both gradient transmissivity and gradient polarization due to the density of the dye dots on the oriented material.

The density of the inkjet dots on the material refers to either the size of the dots in terms of lines per inch, or in terms of the actual amount of material deposited in a given location by the inkjet printer.

In addition to being able to selectively pattern an oriented sheet with a selective pattern corresponding to a gradient matrix that is used to create a gradient polarized sheet, is possible to use the inkjet printer to also selectively deposit transparent dyes of various colors so that the finished lens has not only a gradient polarization effect but also gradient color.

It is in general possible to provide a gradient effect for sunglasses or in fact any optical lens by simply using the jet printer to print the particular colored dyes that are desired such that the lens itself takes on the gradient characteristic of the deposited dyes. In either case, inkjet printing provides the ability to pattern the lens at precise locations with the desired pattern so that for instance a predetermined portion of the lens can be provided with a different characteristic.

Central to the subject invention is the fact that one can utilize an inkjet printer to print transparent stains that result in films having transmissivity corresponding to the transmissivity of polarizing stains such as the iodine or dichroic dyes normally used to produce polarized films. This means and what is over printed on the substrate results in a transparent slide-like film having slide-like transmissivity, as supposed to opaque paint. It has been found that by using utilizing an inkjet printer and dichroic dyes one can deposit transparent staining in much the same way that stain is deposited on an oriented substrate when manufacturing standard polarized films for use in sunglasses; and that is by simply staining the oriented sheet by passing it through a staining bath.

Thus, rather than opaquely printing on a substrate with ink which is the manner in which most printers operate, in subject invention transparent dyes are used as well as regulating the amount of dye deposited to permit viewing through the stained substrate. Thus, the techniques described by Scarpetti for "painting" on polarized material so as to produce a 3-D image is rather used to stain an oriented substrate for producing a transparency with a gradient polarizing pattern that permits viewing through the stained substrate.

As a result, what is provided is a substrate which is over printed with either transparent iodine dyes or dichroic dyes to provide the substrate with a predetermined pattern. In one embodiment this results in a gradient polarized film having maximum polarization at the top of the lens and minimum polarization at the bottom of the lens. This provides the ability to view polarized displays when utilizing the sunglasses by peering downwardly through the relatively unpolarized portion of the sunglass lens so as to be able to view a polarized display. In addition because the density of the printing varies to zero towards the bottom of the lens, it is like viewing through plate glass when viewing a display. So not only is there no polarization effect, there is very little blockage of light when viewing through the bottom of the lens. This is equivalent to taking one's sunglasses off when viewing a display. Since there is no polarization effect when viewing a polarized display and since there is no blockage of light when utilizing the subject lenses, one can readily view a display without attenuation. This makes the displays as clear and bright as if viewed without sunglasses.

In summary, a method is provided for forming sunglass lenses with a predetermined optical gradient, namely a polarized gradient, transmissivity gradient or color gradient in which an ink jet printer is used to print a gradient pattern on an oriented sheet, with the ink jet printer being provided with a dye, in one embodiment a dichroic dye and in another embodiment an iodine dye. The printed oriented sheet is incorporated into a lens to provide the lens with the associated gradient.

BRIEF DESCRIPTION OF THE DRAWINGS

These and other features of the subject invention better understood in connection Detailed Description in conjunction with Drawings of which.

DETAILED DESCRIPTION

Figure 1:
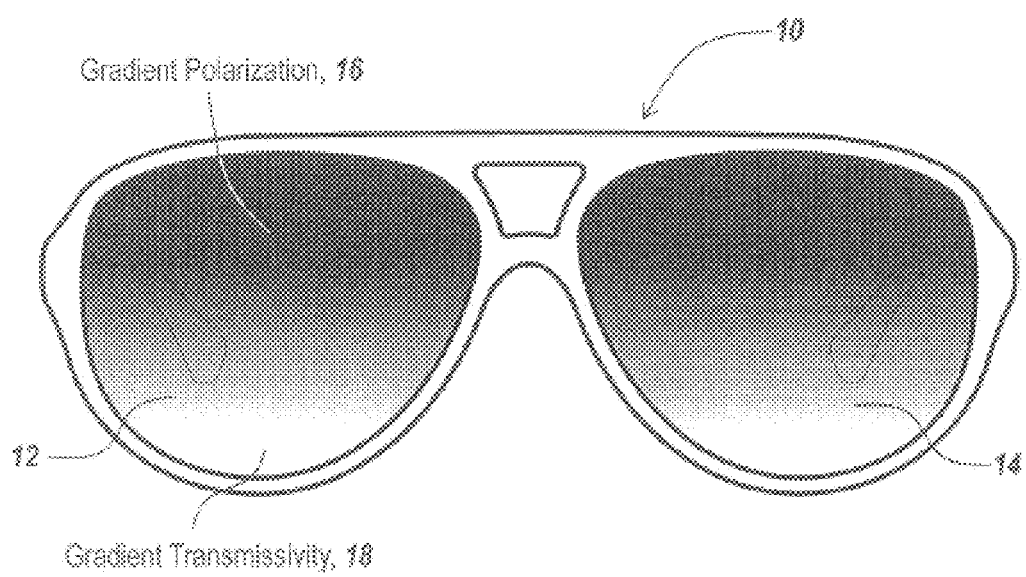
FIG. 1 is a diagrammatic illustration of a front view of sunglasses having a gradient polarizer lens, also exhibiting gradient transmissivity.

Referring to now to FIG. 1, a pair of sunglasses 10 is shown having lenses 12 and 14 with the gradient shading illustrating gradient polarization 16 and concomitant gradient transmissivity 18. Here it can be seen that the gradient polarization is such that the upper portions of lenses 12 and 14 are heavily polarized at the top and lightly polarized at the bottom, whereas concomitantly the transmissivity of lenses 12 and 14 is greater at the bottom as compared to the top. In one embodiment the polarization percentage at the top is close to 100%, whereas at the bottom it is close to 0.04%.

Figure 2:
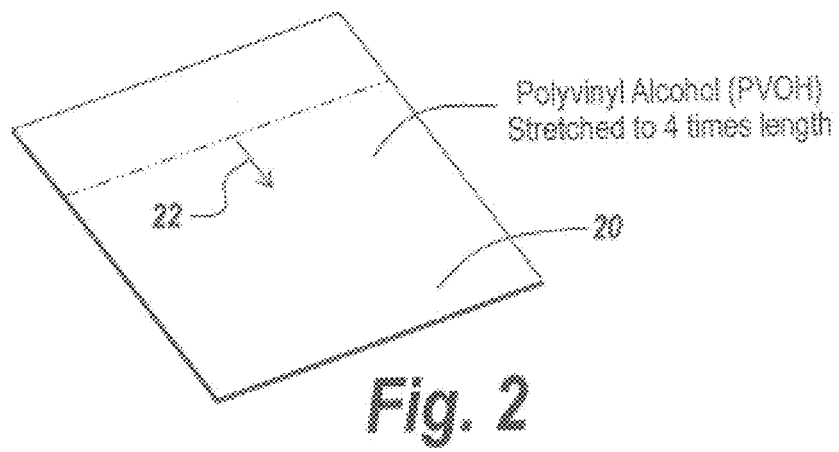
FIG. 2 is a diagrammatic illustration of a sheet of polyvinyl alcohol stretched four times its length to provide an oriented sheet.

The purpose of the subject technique to be able to manufacture a pair of sunglasses with a gradient polarization characteristic. In order to do so in one embodiment an inkjet process is employed. As described in FIG. 2, a polyvinyl alcohol sheet 20 is stretched to four times its length as illustrated by arrow 22 so as to provide an oriented sheet.

Figure 3:
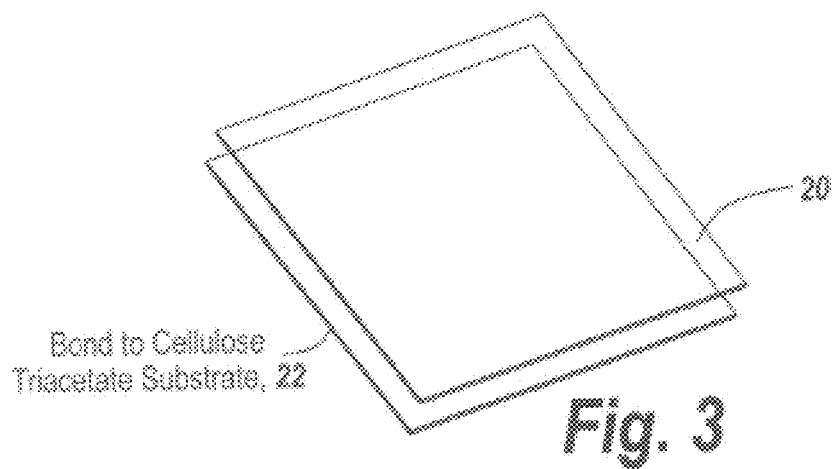
FIG. 3 is diagrammatic illustration of the bonding of a cellulose acetate substrate to the polyvinyl alcohol sheet of FIG. 2.

Referring to FIG. 3, sheet 20 is provided with a cellulose triacetate substrate 22 which is bonded to the bottom of the oriented sheet 20.

Figure 4:
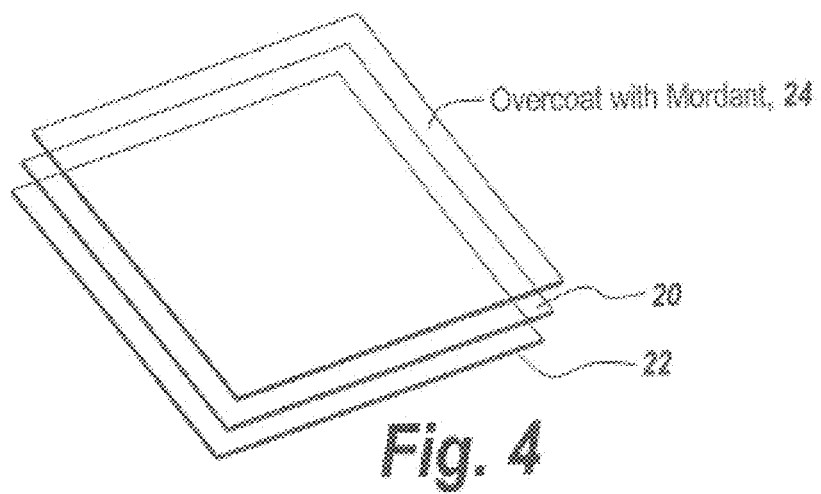
FIG. 4 is a diagrammatic illustration of the overcoating of the structure of FIG. 3 with a mordant.

Referring to FIG. 4, the polyvinyl alcohol oriented sheet 20 with cellulose triacetate substrate 22 bonded thereto is overcoated with a mordant as illustrated at 24.

Figure 5:
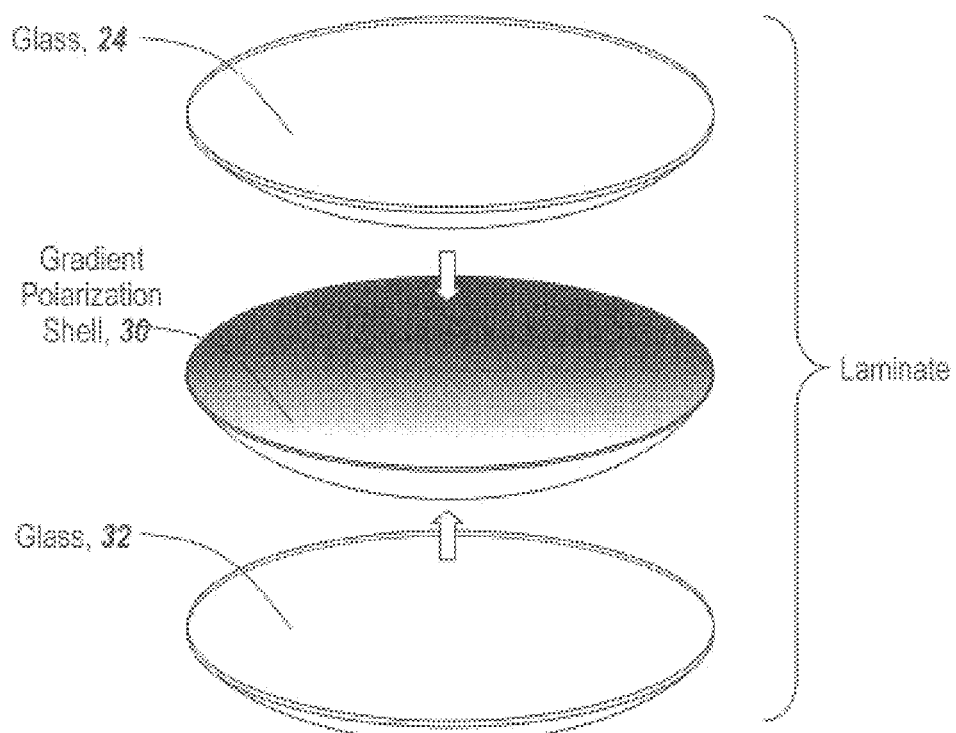
FIG. 5 is an exploded view of the sandwiching of a gradient polarization shell between two glass caps laminated together to provide a lens.

Referring to FIG. 5, when the structure of FIG. 4 has been formed into a curved gradient polarization shell 30, this shell is laminated between two glass caps 32 and 34, with the lamination sandwiching the gradient polarization shell between the glass caps.

Figure 6:
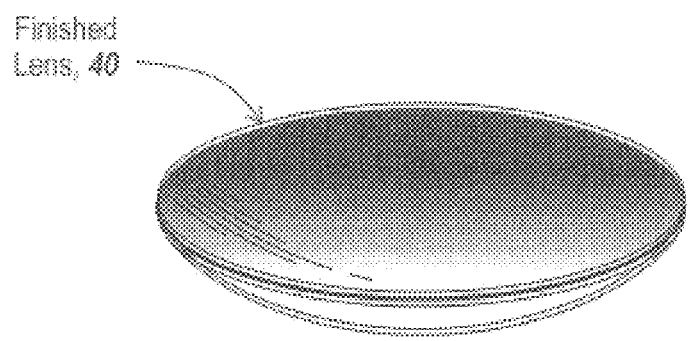
FIG. 6 is a diagrammatic illustration of the completed lens of FIG. 5, showing a finished lens having a gradient polarization characteristic.

As illustrated in FIG. 6, the resulting laminate 40 is a finished lens in which gradient polarization of the lens is provided by the lamination of the gradient polarization shell between the glass caps.

Figure 7:
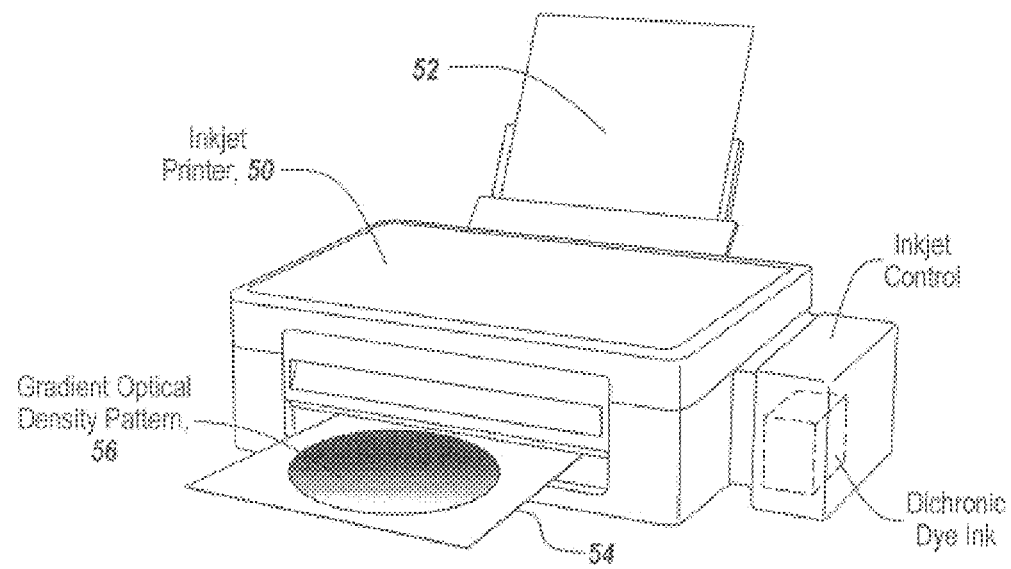
FIG. 7 is a diagrammatic illustration of the utilization of an inkjet printer provided with dichroic dye ink and an oriented sheet to provide a sheet with a gradient optical characteristic, namely gradient polarization.

How this is accomplished is shown in FIG. 7 in which inkjet printer 50 is utilized to print over the coated and backed oriented sheet 52, made printable by the mordant described above. The printer output is an over printed sheet 54 provided with a gradient optical characteristic in the form of a gradient polarization characteristic as illustrated at 56. The printing is accomplished through the utilization of a dichroic dye which is patterned such that the upper portion of what is to be the lens is heavily dyed, whereas the base or bottom portion of the lens is virtually undyed, thus to give the aforementioned gradient optical characteristic.

Figure 8:
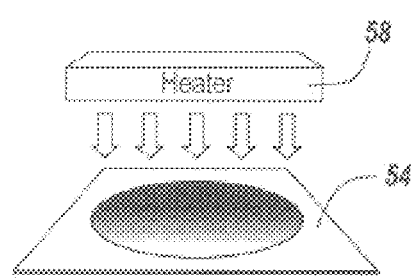
FIG. 8 is a diagrammatic illustration of the printed sheet of FIG. 7 dried by heating to cure the imprinted sheet.
Figure 9:
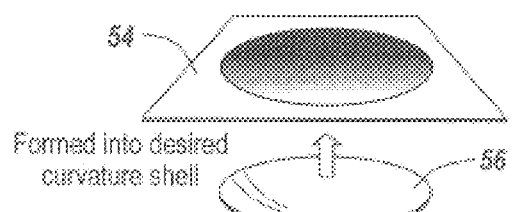
FIG. 9 is a diagrammatic illustration of the molding of the sheet of FIG. 8 into a curved cup shaped shell suitable for incorporating into a sunglass lens.

As shown in FIG. 8, a sheet 54 from the printer 50 is then heated by a heater 58 to dry the dye and as illustrated in FIG. 9, the sheet 54 from the printer 50 is molded into the desired curvature of a shell as illustrated at 56 such that the final structure of the sheet 54 is curved for instance to conform to the #6 curvature of sunglass lenses.

Figure 10:
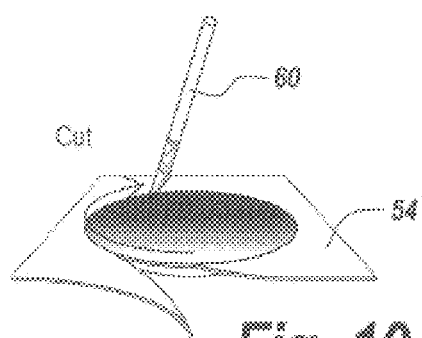
FIG. 10 is a diagrammatic illustration of the cutting of the cup shaped shell formed in FIG. 9.
Figure 11:
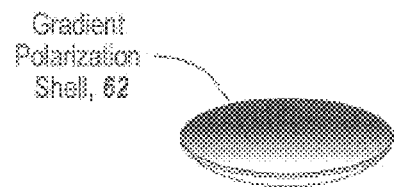
FIG. 11 is diagrammatic illustration of the gradient polarization shell that is the result of the cutting operation of FIG. 10; and, FIG. 12 is a flowchart showing the manufacture of a gradient polarization lens of FIGS. 1-11 using an inkjet printing process.

Referring to FIG. 10, the molded sheet 54 of FIG. 9 is cut as illustrated at 60 to provide a gradient polarized shell 62 as illustrated in FIG. 11 to be laminate between two glass caps to finish the lens.

Figure 12:
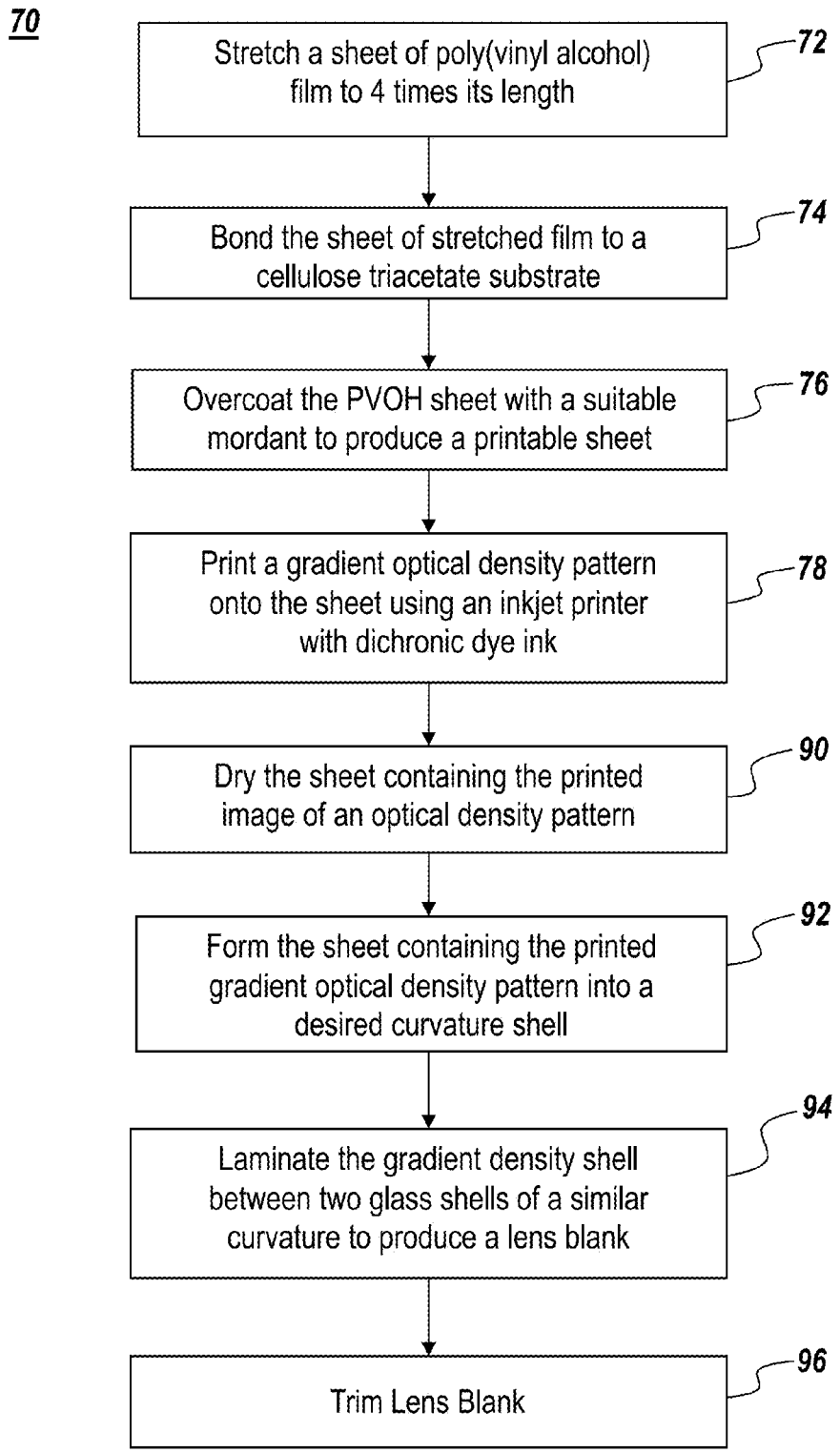

Referring now to FIG. 12, a flowchart 70 illustrates that as a first step 72 a sheet of polyvinyl alcohol of film is stretched to four times its length, followed as illustrated at 74 by bonding a cellulose triacetate substrate to the stretched sheet. Thereafter as illustrated 76, the polyvinyl alcohol sheet is provided with a suitable mordant to produce a printable sheet.

Next, as illustrated at 78 a gradient optical density pattern is printed onto the sheet using an inkjet printer using a dichroic dye ink. The ink is dried as illustrated at 90, with the sheet containing the printed optical density pattern. As illustrated at 92 the sheet containing the printed optical gradient density pattern is formed into a desired curvature shell, followed as illustrated at 94 by laminating the gradient density shell between two glass caps of a similar curvature to produce a lens blank. Thereafter as illustrated 96 the lens blank is trimmed to the desired shape.

What will be seen is that a convenient method of providing a sunglass lens includes providing the prescribed gradient density pattern by utilizing an inkjet printer. The density gradient is controlled by the printing process to provide a selectable gradient pattern of the deposited dye onto the printable substrate. This pattern can provide for the required polarization of the sheet due to the interaction of the dye with the oriented substrate.

Note that while the subject invention has been described utilizing dichroic dyes, other dyes such as iodine dyes are suitable. Dichroic dyes are preferred because if heat is used in the molding process these dyes are less susceptible to the heat used in the molding process.

Moreover, note that the subject inkjet technique provides not only the requisite polarization but also the requisite colorization so that the sunglasses may be tinted as required for various sports and other activities.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for providing a sunglass lens with a predetermined optical polarization gradient, comprising:
   printing an oriented sheet with dye in a pattern in which density of the printed dye varies in a predetermined pattern under control of a printer from one position on the oriented sheet to a different position on the oriented sheet, the printed dye providing a gradient in polarization across a surface thereof; and
   drying the printed oriented sheet with the printed dye thereon;
   whereby the dried printed oriented sheet may be utilized as a layer within the sunglass lens.

2. The method of claim 1, wherein the oriented sheet has an optical gradient comprising a polarization gradient and a transmissivity gradient.

3. The method of claim 1, wherein the dye includes one of dichroic dye and iodine dye.

4. The method of claim 1, wherein the dried printed oriented sheet is sandwiched between two lens caps to form the sunglass lens with a predetermined optical gradient.

5. The method of claim 4, wherein the dried printed oriented sheet and a lens cap are laminated together to form the sunglass lens.

6. The method of claim 1, wherein the dye when printed on the oriented sheet exhibits a gradient polarization based on a printed gradient of the printed dye such that a polarization characteristic of the oriented sheet varies from 100% polarized at one position on the printed oriented sheet to unpolarized at a second portion of the printed oriented sheet.

7. The method of claim 6, wherein the printed portion of the printed oriented sheet has an upper portion and a lower portion and wherein the printed gradient of the printed dye is a result of more printed dye at an upper portion and virtually no dye at a lower portion of the printed oriented sheet.

8. The method of claim 7, wherein the printed oriented sheet exhibits a minimum transmittance at the upper portion of the printed oriented sheet and a maximum transmittance at the lower portion of the printed oriented sheet.

9. The method of claim 8, wherein when the dried printed oriented sheet is utilized in the sunglass lens, the maximum transmittance at the lower portion of the printed oriented sheet in the lower part of the lens resulting in a user's ability to view displays unattenuated by use of the sunglass lens.

10. The method of claim 9, wherein the transmittance is established by an amount of the printed dye at a particular region on the printed oriented sheet.

11. The method of claim 7, wherein the gradient of the dye printed on the sheet establishes gradient polarization for the printed oriented sheet.

12. The method of claim 11, wherein the gradient establishes maximum polarization at the upper portion of the printed oriented sheet and minimum polarization at the lower portion of the printed oriented sheet.

13. The method of claim 12, wherein when the printed oriented sheet is used in a sunglass lens the maximum polarization is at the upper portion of the sunglass lens and wherein the minimum polarization is at the lower portion of the sunglass lens to permit viewing of displays through the bottom lower portion of the sunglass lens.

14. A method for providing a lens with a predetermined optical polarization gradient, comprising:
   providing an oriented sheet with a dipless deposited dye in a pattern in which density of the dye varies in a predetermined pattern from one position on the oriented sheet to a different position on the oriented sheet, the dye providing a gradient polarization characteristic to the oriented sheet; and
   utilizing the oriented sheet as a component of the lens.

15. The method of claim 14, wherein the deposited dye permits providing the lens with a predetermined optical gradient polarization characteristic at a selectable portion of the lens.

16. The method of claim 14, wherein the oriented sheet is molded into a predetermined cupped shape.

17. The method of claim 16, wherein the oriented sheet is sandwiched between cupped lens cups and wherein the lens cups have a predetermined curvature, a molding providing the oriented sheet with the predetermined curvature.

18. A sunglass lens polarization layer made by the method of claim 1.

19. A sunglass lens polarization layer made by the method of claim 14.

* * * * *